(12) United States Patent
Hill et al.

(10) Patent No.: US 7,290,115 B2
(45) Date of Patent: *Oct. 30, 2007

(54) SYSTEM AND METHOD FOR FILTERING WRITE OPERATIONS TO A STORAGE MEDIUM CONTAINING AN OPERATING SYSTEM IMAGE

(75) Inventors: Timothy J. Hill, Woodinville, WA (US); Bruce J. Beachman, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 358 days.

This patent is subject to a terminal disclaimer.

(21) Appl. No.: 11/024,533

(22) Filed: Dec. 29, 2004

(65) Prior Publication Data

US 2005/0144519 A1    Jun. 30, 2005

Related U.S. Application Data

(63) Continuation of application No. 10/152,262, filed on May 21, 2002, now Pat. No. 6,907,512.

(51) Int. Cl.
*G06F 12/00* (2006.01)
*G06F 17/30* (2006.01)
*G06F 7/00* (2006.01)
*G06F 13/00* (2006.01)

(52) U.S. Cl. .................. 711/207; 711/146; 711/154; 711/161; 707/207; 707/208; 714/5; 719/328; 719/329

(58) Field of Classification Search ............... None
See application file for complete search history.

(56) References Cited

U.S. PATENT DOCUMENTS

| | | | |
|---|---|---|---|
| 5,495,571 | A | 2/1996 | Corrie, Jr. et al. |
| 5,983,242 | A | 11/1999 | Brown et al. |
| 6,023,710 | A | 2/2000 | Steiner et al. |
| 6,067,551 | A | 5/2000 | Brown et al. |
| 6,347,294 | B1 | 2/2002 | Booker et al. |
| 6,519,767 | B1 | 2/2003 | Carter et al. |
| 6,766,428 | B2 | 7/2004 | Saulsbury et al. |

OTHER PUBLICATIONS

IBM, "IBM Embedded Development Kit of PC DOS and of Windows® 3.1," Copyright 1999, 4 pp.
Quinnell, "PC/Internet Boom Drives Embedded-Systems Trends," *The Electronics Industry Yearbook/2000*, pp. 193-194.
Bruno et al., "Pebble: A Component-Based Operating System for Embedded Application," Lucent Technologies, Mar. 30, 1999, pp. 1-27.
"Linus as an Embedded Operating System," SSV Embedded Systems 2000, pp. 1-10.

*Primary Examiner*—Reginald Bragdon
*Assistant Examiner*—Mehdi Namazi
(74) *Attorney, Agent, or Firm*—Lee & Hayes, PLLC

(57) ABSTRACT

A write filter is used to handle write operations by an operating system of a computing device that has a main storage medium in which the operating system image is stored. The write filter is placed in the operating system to intercept write commands for writing state data into the main storage medium and to write the state data onto a non-volatile auxiliary storage medium to prevent the state data from being lost when the device is shut down. The write filter creates checkpoints (or watermarks) for the state data in the non-volatile memory to protect them from being written over and to allow the system to roll back to a previous state. The write filter also enables the operating system image in a writable main storage medium of the computing device to be replaced with a new operating system image while the operating system is still running through by gradually copying the new image into the main storage while moving the old image into a look-aside buffer in the RAM.

17 Claims, 4 Drawing Sheets

SYSTEM AND METHOD FOR FILTERING WRITE OPERATIONS TO A STORAGE MEDIUM CONTAINING AN OPERATING SYSTEM IMAGE

RELATED APPLICATION

This application is a continuation of U.S. patent application Ser. No. 10/152,262, filed May 21, 2002, which issued as U.S. Pat. No. 6,907,512 on Jun. 14, 2005.

TECHNICAL FIELD OF THE INVENTION

This invention relates generally to computer operating systems, and more particularly to the control of write operations to a storage medium containing an image of an operating system.

BACKGROUND OF THE INVENTION

Operating systems are at the heart of all computer systems or computing devices. An operating system provides the environment in which software applications are designed to operate. To that end, the operating system manages and schedules the resources of the computer or device it resides in, and provides various function modules and interfaces that can be used by the applications to accomplish their tasks.

As a result of the great advancements in computer technologies, there are many different types of computing devices in common use nowadays. Examples of such devices include set-top boxes, video game boxes, and home gateways. Many of the computing devices do not run a full-fledged operating system like those developed for use on a regular computer. Instead, they have a run-time image of an operating system tailored to support only those functions and resources needed by the devices to serve their intended functions. Such an operating system run-time image, often called an "embedded operating system," typically has a much smaller footprint than that of a regular operating system. The size of the embedded operating system is an important consideration for manufacturers of computing devices, because a smaller operating system image requires a reduced amount of storage medium and/or memory space to store and run it, allowing the devices to be made less expensive.

In many computing devices using embedded operating systems, the run-time image of the operating system is stored on a read-only medium, such as a CD-ROM or traditional "masked/OTP ROM", and the device has no non-volatile writable storage medium. One problem with this arrangement is that during operation the operating system often needs to store state data such as registry entries, user preferences, URLS, etc., for later use. A recent trend is to derive embedded operating systems from operating systems for regular computers. As a result, an embedded operating system may expect to write state data onto a writable storage medium, as a regular operating system would do. This cannot be done, however, since the device does not have a writable storage medium. In the past, this problem was solved by using a component called a "write filter" to intercept the write commands and write the data into the random access memory (RAM) of the system. A major drawback of this approach is that all the state data stored in the RAM is flushed out and lost when the device is turned off. When the device is turned on again, all the state data have to be reentered.

Some computing devices have their embedded operating systems stored in a writable storage medium, such as flash memory or a magnetic disk. Storing the run-time image of the operating system in a writable medium allows the operating system to be updated or modified. For example, a set-top box may receive an updated version of the operating system image via a satellite or cable system and stores the image in the RAM for replacing the existing operating system image in the storage medium.

A conventional approach to handling the replacement of the old operating system with the new operating system is to use a second operating system that is provided for that specific purpose. This approach, however, has several significant drawbacks. First, it requires the main operating system be shut down in order to run the second operating system, which then overwrites the main operating system in the storage medium with the new image in the RAM. This process can take a significant amount of time. Many computing devices, however, are used in applications where they are not allowed to be shut down for the period of time required for this update operation. Second, the second operating system, like the main operating system, also has to be stored in the storage medium so that it can be used to boot the system. Even though it is typically smaller than the main operating system, it may still require a significant amount of storage space. This can be a concern when the cost of the storage medium is relatively high, as in the case of flash memory. Moreover, in the process of writing the new operating system image over the old one, the existing state data are typically lost.

SUMMARY OF THE INVENTION

In view of the foregoing, the present invention provides a system and method that uses a write filter to handle write operations by an operating system of a computing device that has a main storage medium in which the operating system image, application programs, and program data are stored. In accordance with one aspect of the invention, the write filter is placed in the operating system to intercept write commands for writing data, such as state data of the operating system or applications, into the main storage medium and to write the data onto a non-volatile auxiliary storage medium to prevent the data from being lost when the device is shut down. Upon receiving a checkpoint request (e.g., from a user), the write filter checkpoints (or watermarks) the data in the non-volatile memory to protect them from being written over. When a rollback request is received, the write filter removes the checkpoint and deletes data written after the checkpoint to allow data before the checkpoint to be used.

In accordance with another aspect of the invention, the write filter enables a control application to replace the operating system image in a writable main storage medium of the computing device with a new operating system image while the operating system is still running. To that end, the write filter creates a virtual storage device name for use in the replacement operation. Write operations directed to the main storage medium are diverted to a look-aside buffer (LAB). When the write filter receives a read request for data in the main storage medium, it checks whether the requested data are in the LAB and, if so, use the data in the LAB to respond to the read request. In contrast, when the write filter receives a write operation directed to the virtual storage device, it writes the data into the main storage after the corresponding data in the main storage are copied into the look-aside buffer. As the control application gradually copies the new operating system image into the main storage by writing the corresponding data to the virtual memory device, the old operating system image is migrated into the look-aside buffer. After the new operating system image has been copied into the main storage, state data of the operating system are copied into the virtual memory device (and thus stored in the main storage). Thereafter, the computing device is rebooted with the new operating system image in the main storage and the state data fully preserved from the old operating system. This method can also be used to replace images of application programs.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
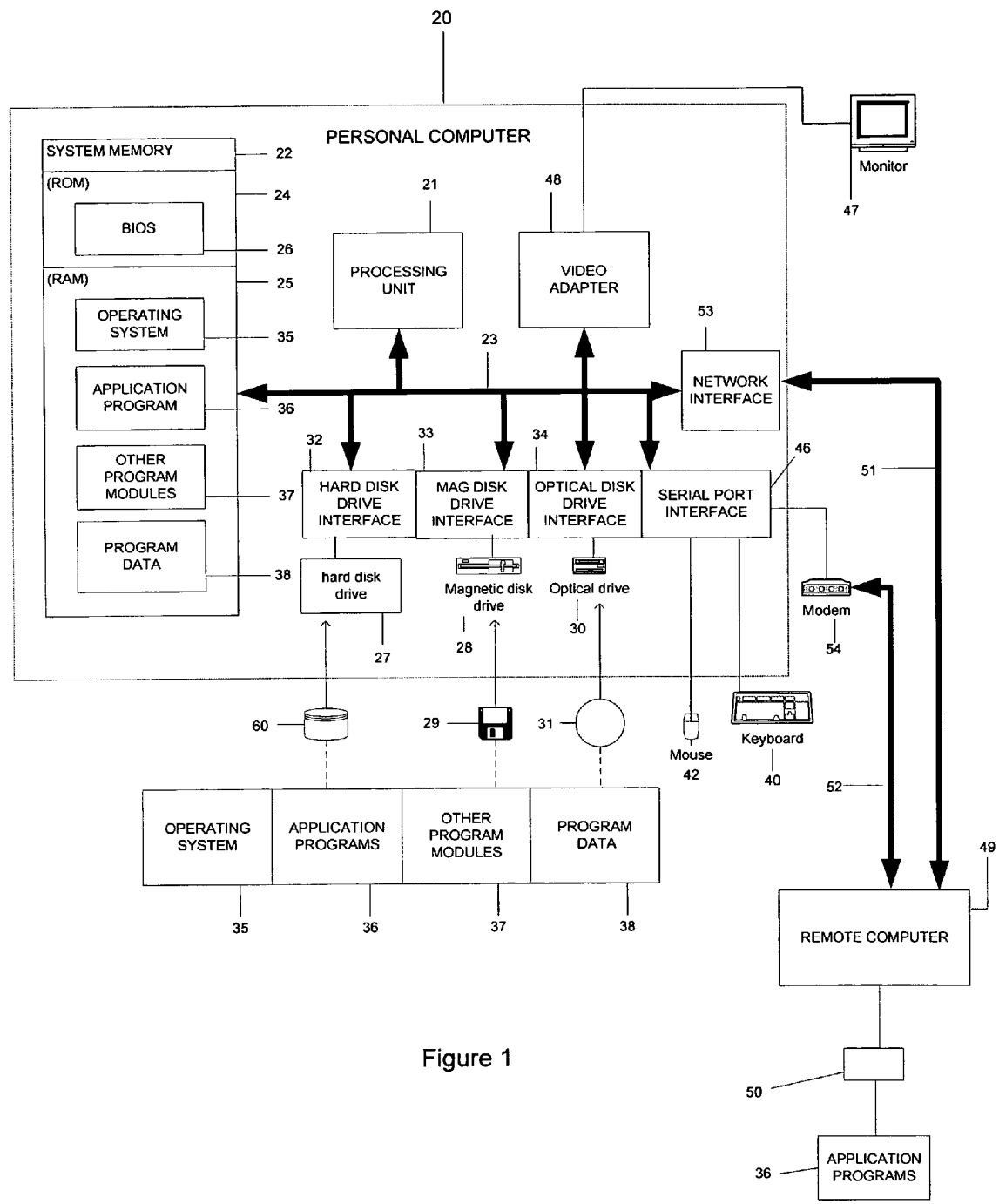
FIG. 1 is a block diagram generally illustrating an exemplary computing device that may be used for implementing the present invention.

Turning to the drawings, wherein like reference numerals refer to like elements, the invention is illustrated as being implemented in a suitable computing environment. Although not required, the invention will be described in the general context of computer-executable instructions, such as program modules, being executed by a computing device. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of an exemplary computing device that may be used for implementing the invention, and the invention will be described in greater detail with reference to FIGS. 2-4. It will be appreciated, however, that the computing device of FIG. 1 includes some components commonly found in full-fledged computing devices, and not all of those components in FIG. 1 are required in a computing device that implements the invention.

Turning now to FIG. 1, a general-purpose computing device 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computing device 20, such as during start-up, is stored in ROM 24. The computing device 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the computing device 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the computing device 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, computing devices typically include other peripheral output devices, not shown, such as speakers and printers.

The computing device 20 may operate in a networked environment using logical connections to one or more remote computers, such as a remote computer 49. The remote computer 49 may be another computing device, a server, a router, a network PC, a peer device or other common network node, and typically includes many or all of the elements described above relative to the computing device 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and, inter alia, the Internet.

When used in a LAN networking environment, the computing device 20 is connected to the local network 51 through a network interface or adapter 53. When used in a WAN networking environment, the computing device 20 typically includes a modem 54 or other means for establishing communications over the WAN 52. The modem 54, which may be internal or external, is connected to the system bus 23 via the serial port interface 46. In a networked environment, program modules depicted relative to the computing device 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner-well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
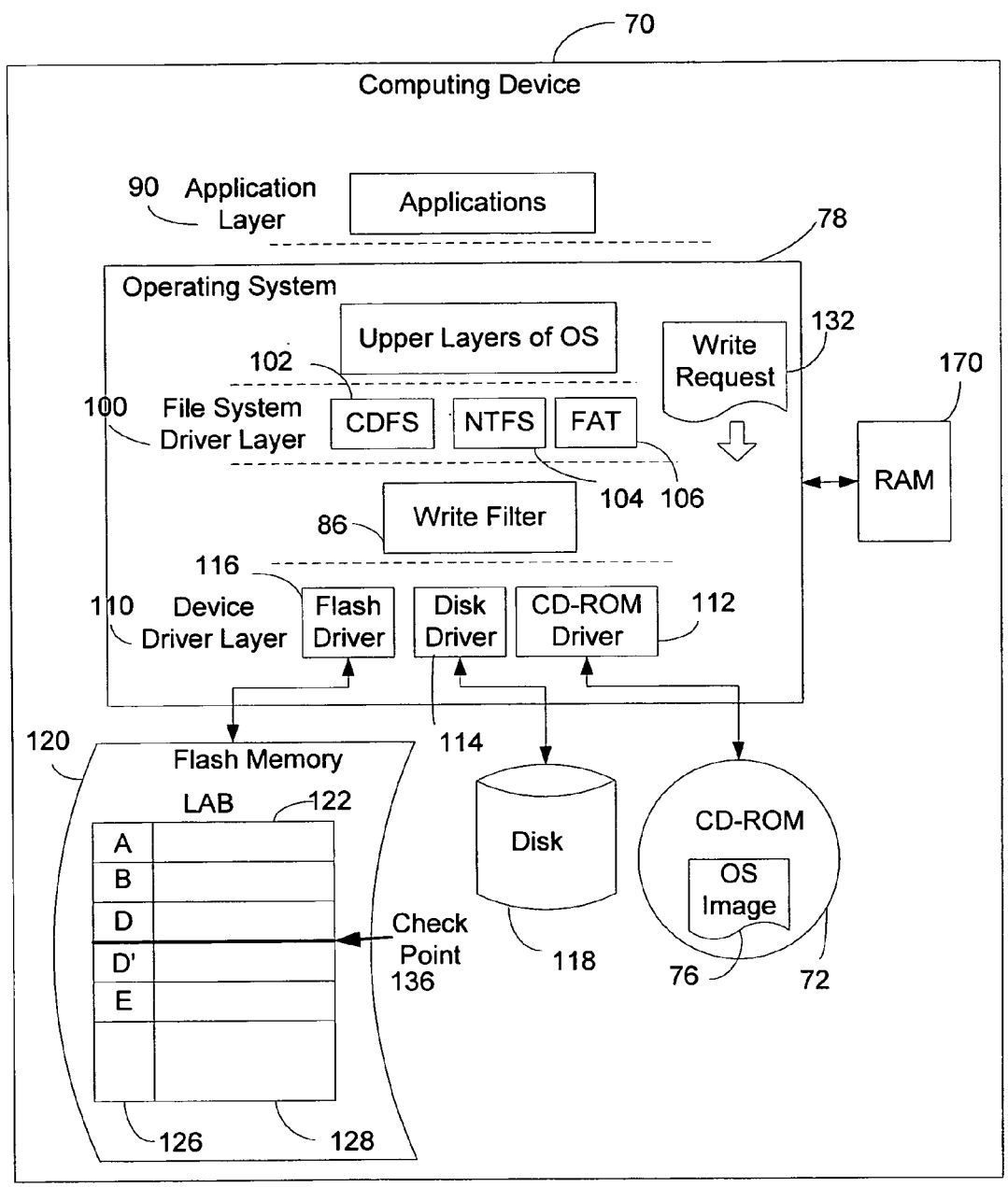
FIG. 2 is a schematic diagram showing an operating system for a computing device that includes a writer filter component for filtering write requests directed to a main storage medium of the device that contains a run-time image of the operating system.

Referring now to FIG. 2, the present invention is directed to a system and method for handling write operations in a computing device 70 that runs from an operating system image 76 stored in a main storage medium. In the embodiment shown in FIG. 2, the main storage medium is a CD-ROM 72. As will be described in greater detail later, the main storage medium may alternatively be a writable medium, such as flash memory or a magnetic disk. In accordance with the invention, the operating system 78 running on the device employs a write filter component 86 to address at least two issues. The first issue is how to maintain state data of the operating system, application programs, and program data in the case where the main storage medium is either physically non-writable or not allowed to be overwritten. The second issue is how to replace the operating system image, application program images, and program data in a writable main storage medium while the system is running so as to avoid having to shut down the system for an extended period of time.

As shown in FIG. 2, the write filter 86 is a component of the operating system 78. Generally, the function of the write filter 86 is to intercept write commands that attempt to write data into the main storage, and store the data at a different storage space. In other words, the writer filter "filters" write commands directed to the main storage so that the data are written to a different place. To that end, the write filter resides in the layered architecture of the operating system 78. For instance, in the embodiment shown in FIG. 2, the operating system 78 includes an application layer 90, a file system driver layer 100, and a physical driver layer 110. The file system driver layer 100 includes, for example, an NT File System (NTFS) driver 104, a File Allocation Table (FAT) driver 106, and a CD-Rom File System (CDFS) driver 102. The physical device driver layer 110 includes physical device drivers such as a CD-ROM class driver 112 for a bootable CD-ROM, a disk class driver 114 for reading and writing from a magnetic disk 118, and a flash class driver 116 for a flash memory 120.

As shown in FIG. 2, the writer filter 86 is disposed between the file system driver layer 100 and the physical driver layer 110. When the write filter 86 is turned on, all file read/write requests from the file system driver layer 100 are intercepted by the writer filter. When the write filter 86 receives a write request, it writes the data into a look-aside buffer (LAB), which may be in the random access memory (RAM) 170 or a non-volatile memory (e.g., the flash memory 120 or the magnetic disk 118) as will be described in greater detail below.

In the particular embodiment shown in FIG. 2, the look-aside buffer 122 is stored in the flash memory 120 and structured as a table. Each entry of the table has a first field 126 containing data identifying a corresponding location, such as a track number, on the main storage that was specified in a write request, and a second field 128 containing the data to be written to that location according to the write request. The entries in the LAB preferably are organized logically according to the order of their corresponding locations on the main storage medium to facilitate quick access and retrieval using a look-up table.

When the write filter 86 receives a read request, it first checks whether the data to be read are in the LAB 122. Specifically, the write filter 86 checks the LAB 122 to see whether it contains an entry or entries that correspond to the storage location specified by the read request. If so, the write filter retrieves the data in the entry or entries of the LAB 122 and returns the data in response to the read request. If the requested data are not in the LAB 122, the write filter 86 passes the read request to the appropriate driver (e.g., the CD-ROM class driver 112) in the physical device driver layer 110 for the main storage medium to retrieve the requested data.

As mentioned above, one function served by the write filter is to intercept and handle write commands in the scenario where the operating system or an application wants to write data to the main storage but the main storage cannot be written over. There are various reasons why the main storage is not writable. For instance, the main storage may be on a storage medium that is not physically writable, such as the CD-ROM 72 in the embodiment of FIG. 2. This case is commonly seen in devices, such as video game boxes, that use a bootable CD-ROM or DVD to store a run-time image of the operating system and applications. It is also possible that the operating system image is stored on a writable medium, such as a magnetic disk or flash memory, but no write operations on that storage medium is allowed due to security or other reasons. For the proper operation of the device, however, the operating system may need to maintain various types of state data, which for example include system registry records, user preferences, etc. Besides the state data, there may be other types of data the operating system wants to store for later use. Similarly, applications 90 may also want to store data for future use. Since the main storage is not writable, such data has to be stored somewhere else.

In accordance with one aspect of the invention, the write filter 86 enables the storing of data persistently onto a non-volatile storage medium. In this regard, applications 90 running on the system and the higher layers of the operating system 78 do not have to know or deal with the details of where the data are stored. As mentioned before, many operating systems for fixed-function computing devices are derived from operating systems developed for regular computers. Such an operating system typically assumes that the device has a writable non-volatile storage medium as the main storage, and the operating system makes write requests directed to the main storage by default. The write filter 86 allows the operating system to work in a computing device that has a non-writable main storage medium by diverting the write operations to a non-volatile auxiliary storage medium so that the state data can be persisted. The auxiliary storage medium may be one of many different types of non-volatile storage media. For example, it may be a magnetic disk 118 or a flash memory 120. The write filter may be set up to divert all write operations to the auxiliary storage medium by default. Alternatively, the write filter may be set to write data into the auxiliary storage only for specific types of data or upon an indication from the user that the data should be persisted.

For purposes of illustration, it is assumed that in the example of FIG. 2 the main storage medium is the CD-ROM 72, and the auxiliary writable storage medium is the flash memory 120. The CD-ROM 72 contains the run-time image 76 of the operating system. When the writer filter 86 receives a write request 132 to store data that are to be persisted, it writes the data into the look-aside buffer (LAB) 122 in the flash memory 120. Since the flash memory 120 is non-volatile, the data stored in the LAB 122 will not be lost when the device 70 is shut down. This allows the device to preserve the state data for the operating system and data for applications to avoid the need to reset the state data for the operating system or applications each time the device is rebooted.

In accordance with a related aspect of the invention, the write filter 86 allows the data stored on the auxiliary storage medium to be "checkpointed" or "watermarked." Specifically, the user or the system may request that a checkpoint be set. In response, the write filter 86 stores a pointer for a checkpoint in the auxiliary storage identifying the data that have been written into the storage up to that time. All the stored data up to the checkpoint are deemed to be protected and cannot be written over. By way of example, FIG. 2 shows three entries in the LAB 122 in the flash memory 120 that correspond to locations A, B, and D on the main storage (the CD-ROM 76). A checkpoint 136 is created to mark these entries as protected. Later, the operating system 78 attempts to write new data to the location D. In response, the write filter 86 creates a new entry D' in the LAB 122 to store the new data. Without the checkpoint, the write filter 86 would write over the entry D with the new data instead of creating the new entry D'. Later, when the write filter 86 receives a read request for data at location D on the main storage, it returns the data in the entry D' in the auxiliary storage.

Thus, checkpointing the auxiliary storage allows older versions of system or application state data to be kept. In a preferred embodiment, multiple checkpoints can be set to indicate multiple previous states of the system. The checkpointing feature is especially useful in cases where the user can frequently reset the state data of the system. In such a case, it is often desirable to return the system to its original settings if the new settings are invalid or causing problems. By preserving the old state data, the system can be returned to its previous state by a rollback operation in which the latest checkpoint is removed and all data entries after that checkpoint are deleted. For instance, in the example illustrated in FIG. 2, when the write filter 86 receives a rollback request, it deletes the entries D' and E, and deletes the checkpoint 136. Thereafter, any read request for data at the location D will be responded with the data stored in the entry D in the LAB 122.

Another function of the write filter 86 of the invention is to facilitate the operation of replacing the existing operating system image with a new operating system image while the computing device is still in service. In this scenario, the operating system image resides in a storage medium that is read-writable. For instance, the main storage medium may be a magnetic disk or flash memory. To avoid any confusion of this scenario with the scenario in the embodiment of FIG. 2 (where the main storage is non-writable), the operation of replacing the operating system image is described with reference to FIG. 3. In the embodiment shown in FIG. 3, the main storage medium is a flash memory 120, which is often a preferred storage medium for fixed-function computing devices due to its lack of movable mechanical parts. As shown in FIG. 3, the computing device has an application 160 for controlling the operation of swapping the operating system image 166 in the flash memory 120 with a new operating system image 162. The new operating system image is temporarily stored in the RAM 170 of the system and may be imported in different ways, such as being downloaded through a satellite connection or a cable connection, or read from a portable storage medium such as a CD-ROM. In this embodiment, the write filter 86 is typically turned off during the regular operation of the computing device. With the write filter turned off, write and read requests are passed directly from the file system driver layer to the flash class driver 116.

Figure 3:
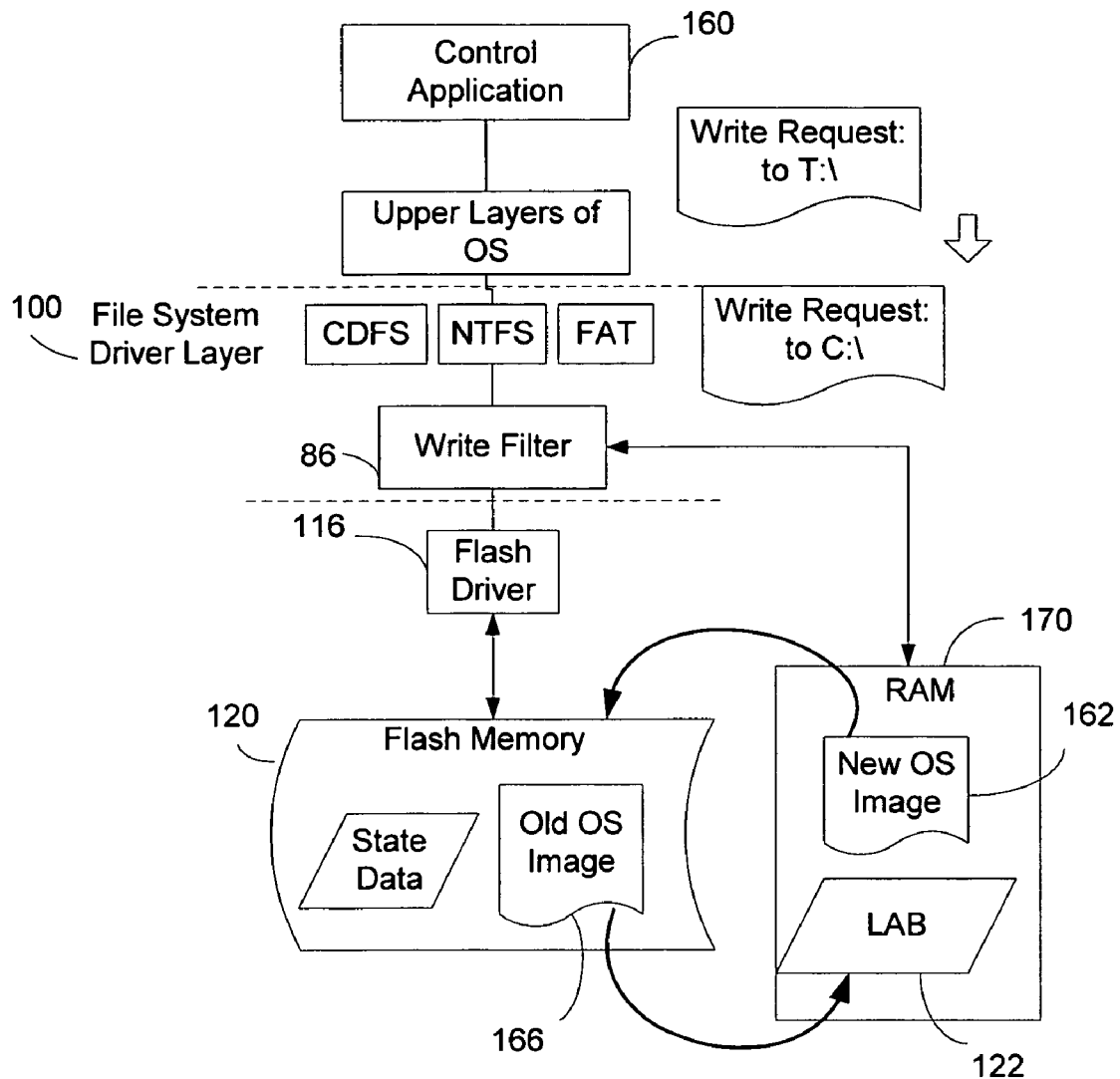
FIG. 3 is a schematic diagram showing the operating system in another embodiment of the computing device wherein the write filter is used in an operation to replace an old operating system image in a writable main storage medium with a new operating system image.
Figure 4:
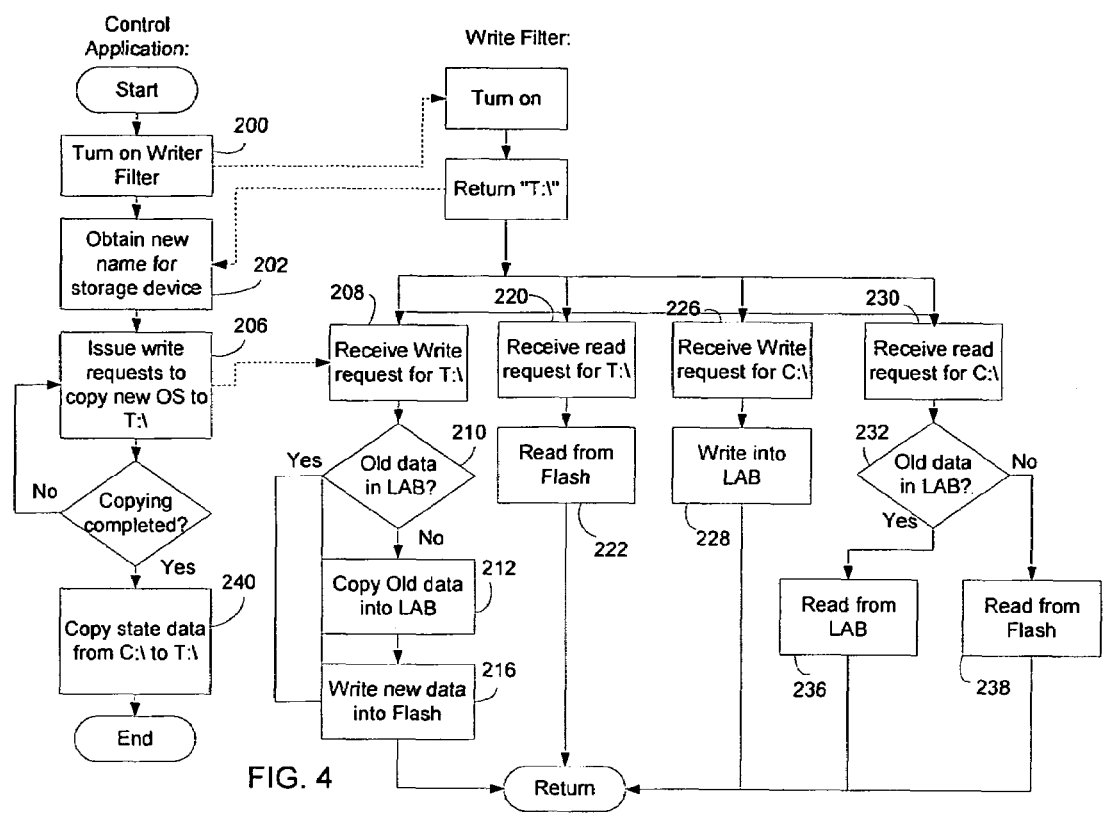
FIG. 4 is a flow diagram showing the operation of replacing the old operating system image with a new operating system image using the write filter.

Referring now to both FIG. 3 and FIG. 4, to initiate the replacement of the old operating system image in the flash memory 120 with the new operating system image 162 in the RAM 170, the control application 160 first turns the write filter 86 on (step 200). When the write filter 86 is on, it intercepts all write requests directed to the flash memory 120, and diverts the write operation to the look-aside buffer (LAB) 122 which resides in the RAM 170 (or alternatively in a non-volatile storage medium). The application 160 then requests the write filter to return a name for a "virtual storage device" for use in the operation of replacing the operating system image 166 (step 202). In response, the write filter 86 creates a storage device name and returns that name to the application 160. As will become clear from the description below, this new virtual storage device name is simply a different way to refer to the main storage medium 120. It is used mainly for differentiating regular write operations from the write operations for replacing the operating system image. By way of example, in the following description, the main storage (the flash memory 120) of FIG. 3 is referred to as "Drive C" in a regular write request, and referred to as "Drive T" in write requests for replacing the operating system image.

After obtaining the new name (i.e., "DRIVE T") for the main storage space, the application starts to copy the new operating system image in the RAM into the main storage by issuing write requests for writing portions of the new operating system image into corresponding locations on Drive T (step 206). When the write filter 86 receives a write request directed to Drive T (step 208), it first checks whether the data at the location specified in the write request has been copied to the LAB in the RAM (step 210). If not, it copies (using the flash class driver 116) the old data at that location into the LAB (step 212), and then passes the write request to the device driver 116 to write the new data into the flash memory (step 216). When the write filter receives a read request to read data from Drive T (step 220), it uses the flash class driver 116 to retrieve data from the corresponding location in the flash memory 120 (step 222). Thus, write and read requests directed to Drive T cause data to be written into or read from the main storage.

In the meantime, the computing device is still in service, and the existing operating system is still running. The task of the write filter 86 is to gradually migrate the old operating system image 166 into the RAM 170 while the new operating system image 162 is being copied into the main storage (the flash memory 120), without interrupting the operation of the device. To that end, when the write filter 86 receives (step 226) a write request directed to Drive C (i.e., the regular name for the flash memory 120), it causes the data in the write request to be written into the LAB 122 in the RAM 170 instead of writing them into the flash memory 120 (step 228). When the write filter receives a read request directed to Drive C (step 230), it checks whether the requested data is in the LAB 122, i.e., whether the LAB table contains an entry corresponding to the location specified in the read request (step 232). If the requested data are in the LAB 122, the writer filter 86 retrieves the data from the LAB and returns them in response to the request (step 236). If the requested data are not in the LAB, the writer filter retrieves them from the specified location in the main storage (step 238).

As the copying of the new operating system image 162 from the RAM 170 to the flash memory 120 (through write requests directed to Drive T) progresses, the old operating system image 166 in the flash memory is gradually replaced by the new operating system image and moved into the LAB. By the time all of the new operating system image has been copied into the flash memory 120, the device is running the old operating system image off the LAB 170. At this point, however, the new operating system image is not yet ready for running since it does not have the state data (e.g., system registry data, user preferences, etc.) used by the old operating system image. To complete the replacement process, the application 160 issues a request to copy all of the state data from Drive C to Drive T (step 240). This causes the state data to be written into the flash memory 120, if they are not already there. At this point, the copying is complete, and the new operating system image (now in the flash memory 120) is ready to be used. When the user shuts the computing device off and turns it back on, the old operating system image in the RAM is flushed out, and the device is rebooted using the new operating system image in the flash memory 120.

It will be observed that during the process 206 of writing the new operating system image 162 to the flash memory 120, the size of the LAB 122 may increase to accommodate the old operating system image 166. This increase in size consumes additional RAM 170. To mitigate this increase in the size of the LAB 122 and reduce the required size of RAM 170 the control application 160 may implement an additional strategy as follows. As each portion of the new operating system-image 162 is written to the flash memory 120 (via Drive T as has been explained), the control application 160 can release (mark as free) the part of the RAM 170 that contained that portion of the new operating system image 162. The amount of RAM released for each portion of the new operating system image 162 is approximately the same as that newly consumed by the LAB 122 (the slight difference in size is caused by the additional LAB data 126). Thus, as the LAB 122 increases in size the new operating system image 162 decreases in size, and hence during the process 206 the total amount of RAM 170 required remains constant.

Although the above discussion focuses on the replacement of an operating system image in a writable main storage, it will be appreciated that the same approach can also be used to replace images of application programs currently running on the device without interrupting the continuous operation of the device.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computing device comprising:
a main storage medium having stored therein an operating system image, the operating image including a write filter; and
a non-volatile auxiliary storage medium,
the write filter being programmed for performing:
intercepting a write request from the operating system to write data into the main storage medium at a specified location;
writing the data of the write request and data representing the specified location into an auxiliary storage medium, the auxiliary storage medium being non-volatile;
receiving a checkpoint request to watermark data stored on the auxiliary storage medium;
creating a checkpoint for watermarking data stored in the auxiliary storage medium as of a time of the checkpoint for preventing the data stored of the time of the checkpoint from being written over;
receiving a rollback request;
in response to the rollback request, deleting data in the auxiliary storage medium stored after the checkpoint; and
removing the checkpoint to allow the data stored as of the time of the checkpoint to be written over.

2. A computing device as in claim 1, wherein the main storage medium is a read-only memory device.

3. A computing device as in claim 1, wherein the main storage medium is an optical storage device.

4. A computing device as in claim 1, wherein the auxiliary storage medium is a flash memory.

5. A computing device as in claim 1, wherein the operating system includes system file drivers and physical device drivers, and wherein the writer filter is disposed between the file drivers and physical device drivers.

6. A method of controlling write operations in a computing device having a main storage medium storing an operating system and an auxiliary storage medium, comprising:
intercepting a write request from the operating system to write data into the main storage medium at a specified location;
writing the data of the write request and data representing the specified location into an auxiliary storage medium, the auxiliary storage medium being non-volatile;
creating a checkpoint for watermarking data stored in the auxiliary storage medium as of a time of the checkpoint for preventing the data stored of the time of the checkpoint from being written over;

receiving a rollback request;

in response to the rollback request, deleting data in the auxiliary storage medium stored after the checkpoint; and removing the checkpoint to allow the data stored as of the time of the checkpoint to be written over.

7. A method as in claim 6, wherein the main storage medium is a read-only memory device.

8. A method as in claim 6, wherein the auxiliary storage medium is a flash memory.

9. A computing device comprising:

a main storage medium having an existing operating system image stored therein; and a look-aside buffer, the main storage medium having stored therein a write filter programmed to replace the existing operating system in the main storage medium with a new operating system image by performing:

receiving a write request to write new data representing a portion of the new operating system image to a specific location of a virtual storage device;

checking, by the write filter, whether old data at the location in the main storage medium corresponding to the specified location of said each write request has been copied into a look-aside buffer;

if said old data has not been copied, copying said old data into the look-aside buffer; and writing said new data into the main storage medium.

10. A computing device as in claim 9, where in the write filter is further programmed to perform:

receiving a write request directed to the main storage medium;

writing data of said write request directed to the main storage medium into the look-aside buffer;

receiving a read request directed to the main storage medium for data at a specified location;

checking whether the look-aside buffer contains buffered data corresponding the specified location of the read request; and if the look-aside buffer contains buffered data corresponding the specified location of the read request, returning the buffered data in response to the read request.

11. A computing device as in claim 9, wherein the main storage medium is a flash memory.

12. A computing device as in claim 9, wherein the look-aside buffer is in a random access memory of the computing device.

13. A computing device as in claim 9, having computer-executable instructions for performing the step of issuing a write request to copy state data of the existing operating system image from the main storage medium to the virtual storage device.

14. A method of replacing an old software program image in a main storage medium of a computing device with a new software program image, comprising:

turning on a write filter in an operating system of the computing device;

issuing write requests to progressively copy portions of the new software program image into a virtual storage device;

receiving, by the write filter, a write request to write new data to a specific location of the virtual storage device;

checking, by the write filter, whether old data at the location in the main storage medium corresponding to the specified location of said each write request has been copied into a look-aside buffer;

if said old data has not been copied, copying said old data into the look-aside buffer; and writing said new data into the main storage medium.

15. A method as in claim 14, wherein the old and new software program images are operating system images.

16. A method as in claim 14, further comprising steps performed by the write filter:

receiving a write request directed to the main storage medium;

writing data of said write request directed to the main storage medium into the look-aside buffer;

receiving a read request directed to the main storage medium for data at a specified location;

checking whether the look-aside buffer contains buffered data corresponding the specified location of the read request; and if the look-aside buffer contains buffered data corresponding the specified location of the read request, returning the buffered data in response to the read request.

17. A method as in claim 14, wherein the main storage medium is a flash memory.

* * * * *